(12) United States Patent
Bhat et al.

(10) Patent No.: US 10,742,599 B2
(45) Date of Patent: Aug. 11, 2020

(54) CONFLICT RESOLUTION IN SEGMENT ROUTING

(71) Applicant: Juniper Networks, Inc., Sunnyvale, CA (US)

(72) Inventors: Bharath RadhaKrishna Bhat, Bangalore (IN); Shraddha Hegde, Bangalore (IN); William Britto Arimboor Joseph, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 304 days.

(21) Appl. No.: 15/843,984

(22) Filed: Dec. 15, 2017

(65) Prior Publication Data

US 2019/0007372 A1    Jan. 3, 2019

(30) Foreign Application Priority Data

Jun. 30, 2017 (IN) .............................. 201741023033
Jul. 3, 2017 (IN) .............................. 201741023340

(51) Int. Cl.
*H04L 29/12* (2006.01)
*H04L 12/723* (2013.01)
*H04L 12/761* (2013.01)
*H04L 12/721* (2013.01)

(52) U.S. Cl.
CPC .......... *H04L 61/3005* (2013.01); *H04L 45/16* (2013.01); *H04L 45/34* (2013.01); *H04L 45/50* (2013.01); *H04L 61/2046* (2013.01); *H04L 61/6018* (2013.01); *H04L 61/6068* (2013.01)

(58) Field of Classification Search
CPC ............. H04L 61/3005; H04L 61/2046; H04L 61/6018; H04L 61/6068; H04L 45/16; H04L 45/34; H04L 45/50
See application file for complete search history.

(56) References Cited

U.S. PATENT DOCUMENTS

| | | | |
|---|---|---|---|
| 9,660,897 B1 * | 5/2017 | Gredler ................... | H04L 45/50 |
| 2015/0195178 A1 * | 7/2015 | Bhattacharya ........ | H04L 45/745 718/1 |
| 2016/0248663 A1 | 8/2016 | Patel et al. | |

OTHER PUBLICATIONS

Previdi et al., "IS-IS Extensions for Segment Routing, draft-ietf-isis-segment-routing-extensions-13," Internet-Draft, IS-IS for IP Internets, Jun. 19, 2017, 33 pp.

(Continued)

*Primary Examiner* — Kristie D Shingles
(74) *Attorney, Agent, or Firm* — Shumaker & Sieffert, P.A.

(57) ABSTRACT

In general, techniques are described for conflict resolution in source packet routing in networking. For example, a first router receives a first advertisement originated in a first Interior Gateway Protocol (IGP) level. The first advertisement specifies a first prefix and a segment identifier (SID). The first router also receives a second advertisement originated in a second IGP level of the network. The second advertisement specifies a second prefix and the SID. Based on the first advertisement and the second advertisement specifying the same SID and based on the first IGP level having less visibility than the second IGP level, the first router selects the SID to be associated with a route to the first prefix.

28 Claims, 9 Drawing Sheets

(56) References Cited

OTHER PUBLICATIONS

Nayak, "Administrative distance & Route preference Comparison between Cisco, Juniper, HP, Huawei Routers," Cisco, XP-002785739, retrieved from https://www.linkedin.com/pulse/administrative-distance-route-preference-comparison-between-nayak/, May 7, 2017, 5 pp.

Extended Search Report from counterpart European Application No. 18175312.0, dated Nov. 9, 2018, 11 pp.

Filsfils et al., "Segment Routing Architecture, draft-filsfils-rtgwg-segment-routing-00," Internet-Draft, Network Working Group, Jun. 28, 2013, 28 pp.

Filsfils et al., "Segment Routing Use Cases, draft-filsfils-rtgwg-segment-routing-use-cases-01," Internet-Draft, Network Working Group, Jul. 14, 2013, 46 pp.

Filsfils et al., "Segment Routing Architecture, draft-ietf-spring-segment-routing-04," Internet-Draft, Network Working Group, Jul. 31, 2015, 21 pp.

Previdi et al., "Source Packet Routing in Networking (SPRING) Problem Statement and Requirements," RFC 7855, Internet Engineering Task Force (IETF), May 2016, 19 pp.

Ginsberg et al., "Segment Routing Conflict Resolution, draft-ietf-spring-conflict-resolution-03," Internet-Draft, Network Working Group, Apr. 27, 2017, 17 pp.

Moy, "OSPF Version 2," RFC 2328, Network Working Group, Apr. 1998, 244 pp.

Coltun et al., "OSPF for IPv6," RFC 5340, Network Working Group, Jul. 2008, 94 pp.

Sheth et al., "OSPF Hybrid Broadcast and Point-to-Multipoint Interface Type," RFC 6845, Internet Engineering Task Force (IETF), Jan. 2013, 9 pp.

Oran, "OSI IS-IS Intra-domain Routing Protocol," RFC 1142, Network Working Group, Feb. 1990, 157 pp.

Li et al., "IGP Requirements for Traffic Engineering with MPLS, draft-li-mpls-igp-te-00," Internet-Draft, Network Working Group, Feb. 1999, 6 pp.

Vasseur et al., "Path Computation Element (PCE) Communication Protocol (PCEP)," RFC 5440, Network Working Group, Mar. 2009, 87 pp.

Enns et al., "Network Configuration Protocol (NETCONF)," RFC 6241, Internet Engineering Task Force (IETF), Jun. 2011, 113 pp.

Ginsberg et al., "Segment Routing MPLS Conflict Resolution, draft-ietf-spring-conflict-resolution-04," Internet-Draft, Network Working Group, May 24, 2017, 20 pp.

Filsfils et al., "Segment Routing Architecture, draft-ietf-spring-segment-routing-11," Internet-Draft, Network Working Group, Feb. 16, 2017, 28 pp.

Singh, "Yet Another Blog About Segment Routing—Part 1," Packet Pushers, PacketPushers.net, Apr. 27, 2015, accessed from URL http://packetpushers.net/yet-another-blog-about-segment-routing-part-1/, 21 pp.

Lindem et al., "OSPFv3 LSA Extendibility, draft-acee-ospfv3-lsa-extend-01.txt," Internet-Draft, Network Working Group, Jul. 15, 2013, 28 pp.

Filsfils et al., "Segment Routing with MPLS data plane, draft-filsfils-spring-segment-routing-mpls-03," Internet-Draft, Network Working Group, Jul. 31, 2014, 14 pp.

"[Spring] Mail regarding draft-ietf-spring-conflict-resolution," Email from Shraddha Hegde, shraddha@juniper.net, to draft-ietf-spring-resolution@ietf.org and draft-ietf-spring-conflict-resolution@ietf.org (May 3, 2017, 16:57:45).

Response to Extended Search Report dated Jan. 7, 2019, from counterpart European Application No. 18175312.0, filed Jul. 1, 2019, 22 pp.

Intent to Grant dated Nov. 18, 2019, from counterpart European Application No. 18175312.0, 58 pp.

\* cited by examiner

CONFLICT RESOLUTION IN SEGMENT ROUTING

This application claims the benefit of Indian Provisional Patent Application 201741023033, filed Jun. 30, 2017, and Indian Provisional Patent Application 201741023340, filed Jul. 3, 2017, the entire content of each of which is incorporated herein by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices (i.e., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques, such as by using a Source Packet Routing in Networking (SPRING) protocol, that provides segment routing within an IGP domain to advertise single or multi-hop LSPs. SPRING includes multiple different label types including "adjacency" labels and "node" labels. To forward a packet through the network, the routers may push (and pop) one or more labels in a label stack, e.g., a segment list, that is applied to the packet as it is forwarded through the network.

SUMMARY

In general, this disclosure describes techniques for resolving conflicts arising in segment routing. As described herein, a router may receive advertisements originated by other routers in a network. Each respective advertisement may specify a respective prefix and a respective segment identifier (SID). The respective prefix may be an address or block of addresses. For instance, the respective prefix may specify an Internet Protocol (IP) address or block of IP addresses. Typically, in response to receiving an advertisement, the router determines a route through the network to the prefix specified by the advertisement. Additionally, the router associates the SID with the route. Subsequently, when the router receives a packet with the SID attached, the router typically forwards the packet to a next hop along the determined route associated with the SID.

However, there are scenarios where a router receives two or more advertisements that specify the same prefix, but different SIDs. Moreover, there are scenarios where a router receives two or more advertisements that specify different prefixes, but the same SID. As described below, this disclosure describes techniques for handling these scenarios.

In one example, this disclosure describes a method comprising: receiving, by a first router in a network, a first advertisement originated by a second router in a first Interior Gateway Protocol (IGP) level of the network, wherein the first advertisement specifies a first prefix and a segment identifier (SID); receiving, by the first router, a second advertisement originated by a third router in a second IGP level of the network, wherein the second advertisement specifies a second prefix and the SID; based on the first advertisement and the second advertisement specifying the same SID and based on the first IGP level having less visibility than the second IGP level: selecting, by the first router, the SID to be associated with a route to the first prefix instead of the SID being associated with a route to the second prefix; and generating, by the first router, data associating the SID with the route to the first prefix; and installing, by the first router, the route to the first prefix as an active route.

In another example, this disclosure describes a method comprising: receiving, by a first router in a network, a first advertisement originated by a second router in a first Interior Gateway Protocol (IGP) level of the network, wherein the first advertisement specifies a first prefix and a first segment identifier (SID); receiving, by the first router, a second advertisement originated by a third router in a second IGP level of the network, wherein the second advertisement specifies a second prefix and a second SID, the second SID being different from the first SID; based on the first prefix being equal to the second prefix and based on the first IGP level having less visibility than the second IGP level: selecting, by the first router, the first SID as being associated with a route to the first prefix instead of the second SID being associated with the route to the first prefix; and generating, by the first router, data associating the first SID with the route to the first prefix; and installing, by the first router, the route to the first prefix as an active route.

In yet another example, this disclosure describes a method comprising: receiving, by a first router in a network, a first advertisement originated by a second router of the network, wherein the first advertisement specifies a first prefix and a segment identifier (SID); receiving, by the first router, a second advertisement originated by a third router of the network, wherein the second advertisement specifies a second prefix and the SID; based on the first advertisement and the second advertisement specifying the same SID and based on the first routing protocol being associated with a lower administrative distance than the second routing protocol: selecting, by the first router, the SID to be associated with a route to the first prefix instead of the SID being associated with a route to the second prefix; and generating, by the first router, data associating the SID with the route to the first prefix; and installing, by the first router, the route to the first prefix as an active route.

In yet another example, this disclosure describes a router comprising: a plurality of interface cards (IFCs) configured to: receive a first advertisement originated by a second router in a first Interior Gateway Protocol (IGP) level of a network, wherein the first advertisement specifies a first prefix and a segment identifier (SID); and receive a second advertisement originated by a third router in a second IGP level of the network, wherein the second advertisement specifies a second prefix and the SID; and a control unit configured to: based on the first advertisement and the second advertisement specifying the same SID and based on the first IGP level having less visibility than the second IGP level: select the SID to be associated with a route to the first prefix instead of the SID being associated with a route to the second prefix; and generate data associating the SID with the route to the first prefix; and install the route to the first prefix as an active route.

In yet another example, this disclosure describes a router comprising: a plurality of interface cards (IFCs) configured to: receive a first advertisement originated by a second router in a first Interior Gateway Protocol (IGP) level of a network, wherein the first advertisement specifies a first prefix and a first segment identifier (SID); and receive a second advertisement originated by a third router in a second IGP level of the network, wherein the second advertisement specifies a second prefix and a second SID, the second SID being different from the first SID; and a control unit configured to: based on the first prefix being equal to the second prefix and based on the first IGP level having less visibility than the second IGP level: select the first SID as being associated with a route to the first prefix instead of the second SID being associated with the route to the first prefix; and generate data associating the first SID with the route to the first prefix; and install the route to the first prefix as an active route.

In yet another example, this disclosure describes a router comprising: a plurality of interface cards (IFCs) configured to: receive a first advertisement originated by a second router of a network, wherein the first advertisement specifies a first prefix and a segment identifier (SID); receiving, by the first router, a second advertisement originated by a third router of the network, wherein the second advertisement specifies a second prefix and the SID; and a control unit configured to: based on the first advertisement and the second advertisement specifying the same SID and based on the first routing protocol being associated with a lower administrative distance than the second routing protocol: select the SID to be associated with a route to the first prefix instead of the SID being associated with a route to the second prefix; and generate data associating the SID with the route to the first prefix; and install the route to the first prefix as an active route.

The details of one or more examples are set forth in the accompanying drawings and the description below. Other features, objects, and advantages will be apparent from the description, drawings, and from the claims.

DETAILED DESCRIPTION

Figure 1:
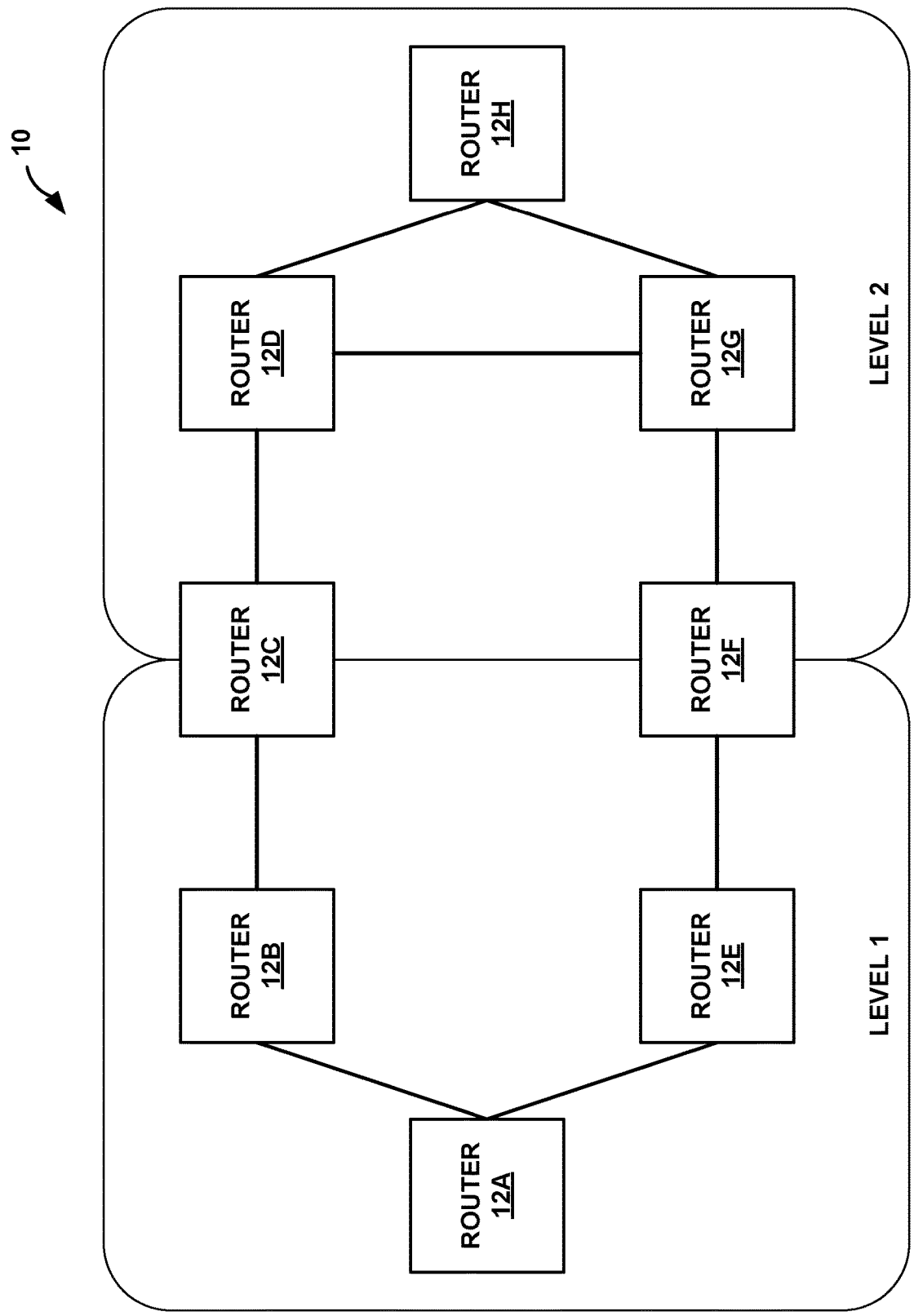
FIG. 1 is a block diagram illustrating an example network that supports source packet routing, in accordance with techniques described in this disclosure.

FIG. 1 is a block diagram illustrating an example network 10 that supports source packet routing, in accordance with techniques described in this disclosure. Source packet routing, which may also be referred to as Segment Routing, is a control-plane architecture that enables an ingress router to steer a packet through a specific set of nodes and links in a network.

In the example of FIG. 1, network 10 includes routers 12A-12H (collectively, "routers 12"). In some examples, router 12A serves as an ingress router, and hence, may be referred to in this disclosure as ingress router 12A. The sources of the network traffic received by ingress router 12A may comprise one or more devices (not shown) and/or any public or private network or the Internet that provides traffic to ingress router 12A in network 10. Furthermore, in some examples, router 12H serves as an egress router, and hence, may be referred to in this disclosure as egress router 12H. The destinations of the network traffic being forwarded on LSPs may comprise one or more destination devices and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 10.

In the example of FIG. 1, routers 12 may use segment routing techniques, e.g., Source Packet Routing in Networking (SPRING) protocol. For example, segment routing techniques are used to configure labels for paths from ingress router 12A to egress router 12G. Segment routing within an Internal Gateway Protocol (IGP) domain (e.g., network 10) allows routers to advertise single or multi-hop LSPs within the IGP domain such as a segment routing LSP. In other words, segment routing may engage IGPs for advertising two types of network segments (e.g., tunnels). First, a strict-forwarded 1-hop tunnel that carries packets over a specific link between two nodes, irrespective of the link cost (hereafter shall be referred to as "adjacency segments"). Second, a multi-hop tunnel using shortest path links between two specific nodes or to a specific prefix (hereafter shall be referred to as "prefix segments"). Example IGPs include Intermediate System-Intermediate System (IS-IS) and Open Shortest Path First (OSPF).

For segment routing within prefix segments, the "path" information is disseminated between the routers as part of the IGP link state information for the domain. Ingress router 12A is able to steer a packet through a controlled set of instructions, called segments, by prepending one or more segment identifiers (SIDs) to the packet. In other words, ingress router 12A can steer a packet through a desired set of nodes and links by prepending the packet with an appropriate combination (stack) of SIDs. Segment routing allows routers to enforce a flow through any topological path and service chain while maintaining per-flow state only at the ingress node to the segment routing domain.

One potential advantage of segment routing may be that the segment routing architecture can be directly applied to the Multi-protocol Label Switching (MPLS) data plane with no change in the forwarding plane. A network administrator need only allocate SIDs to particular routers and the segment routing IGP control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 2017; and (3) "Segment Routing with MPLS data plane," IETF draft: draft-filsfils-spring-segment-routing-mpls-03, Aug. 1, 2014.

Each of routers 12 may be associated with a prefix. For instance, an administrator may assign prefixes to routers. A prefix may be an address or block of addresses. The prefix corresponding to a node (e.g., a router) may comprise an Internet Protocol (IP) address, block of IP addresses, or other type of data identifying the node. Additionally, one or more of routers 12 may be configured with a segment identifier (SID). In some examples, routers 12 are configured with prefixes and SIDs by manual configuration. A router in network 10 may advertise its prefix and SID to other routers 12 in network 10. In other words, the router may originate an advertisement specifying a prefix and a SID. For example, router 12D may advertise that its prefix is 2.2.2.33/32 and that its SID is 1063. To advertise a prefix and SID, a router may send messages to neighboring routers specifying the prefix and the SID. For example, router 12D may send message to routers 12C, 12Q and 12H.

When a router receives an advertisement, the router may forward the advertisement to neighboring routers. For example, if router 12C receives an advertisement from router 12D, router 12C may forward the advertisement to router 12B. In this way, eventually each of routers 12 receives the advertisement. A router that merely forwards an advertisement is not considered to originate the advertisement. Additionally, when a router receives an advertisement, the router determines whether the prefix specified in the advertisement is already associated with the SID specified in the advertisement. If this is the case and if the advertisement represents a new best path, the router may update a routing table in response to the advertisement such that the routing table indicates a next hop in the route to the prefix. If the advertisement represents an equal cost compared to the existing route, the router may add an equal-cost multi-path (ECMP) next hop to the existing route.

However, if the advertisement specifies a prefix and a SID that are not already in the router's link state database (LSDB), the router may calculate a route to the prefix specified in the advertisement. For example, if router 12C receives an advertisement that specifies a prefix assigned to router 12H, router 12C may calculate a route through network 10 to router 12H (e.g., via router 12C and router 12D). In some examples, the router may calculate the route according to a shortest path algorithm or a strict shortest path algorithm. Furthermore, in some examples, an advertisement may specify the type of algorithm to use to calculate the route to the prefix specified in the advertisement. Additionally, the router may associate the SID specified by the advertisement with the calculated route to the prefix specified by the advertisement. In other words, the router may generate data that associate the SID with the route. The router may then install the route as an active route. Installing a route as an active route may comprise generating forwarding information that a forwarding component of the router may use to forward packets to next hops of routes associated with SIDs attached to the packets. For instance, installing the route as an active route may comprise generating information in a forwarding table that maps a SID to an interface card attached to a link to a next hop of the route associated with the SID.

A network, such as network 10, may be partitioned into a hierarchy of IGP levels. IGP levels may also be referred to as "IGP areas." For instance, network 10 comprises two levels: Level 1 and Level 2. In the example of FIG. 1, routers 12A, 12B, 12C, 12E, and 12F are in Level 1 and routers 12C, 12D, 12F, 12G, and 12H are in Level 2. Routers 12C and 12F are in both Level 1 and Level 2. Higher levels in the hierarchy of IGP levels have greater visibility than lower levels in the hierarchy of IGP levels. Nodes in a second level having greater visibility than a first, lower level may store data describing nodes and routes in the lower-visibility level. In other words, the nodes in the first level can view more, and hence, are considered to have greater visibility. However, nodes in a given level typically do not store data describing nodes and routes, including prefixes and SIDs, in any level with greater visibility than the given level. For instance, a router in a lower-visibility IGP level does not typically store a link-state database (LSDB) and corresponding prefix advertisements for any higher-level IGP level. An LSDB may be a database describing the topology of a network or a portion of a network.

In the example of FIG. 1, routers 12C, 12D, 12F, 12G, and 12H may store data regarding routers 12C, 12D, 12F, 12G, and 12H and the links between of routers 12C, 12D, 12F, 12G, and 12H. Additionally, routers 12C, 12D, 12F, 12G, and 12H may store data (e.g., prefixes and SIDs) advertised by routers 12A, 12B, and 12E. In this example, routers 12A, 12B, and 12E store data regarding routers 12A, 12B, 12C, 12E, and 12F, and the links of routers 12A, 12B, 12C. However, routers 12A, 12B and 12E typically do not store data, such as prefixes, regarding routers 12D, 12G, or 12H or the links of routers 12D, 12G, or 12H.

As noted above, a network may comprise a hierarchy of IGP levels. For instance, network 10 comprises Level 1 and Level 2. When an advertisement originated by a router in a lower-visibility level (e.g., Level 1) reaches a router that spans the lower-visibility IGP level and a higher-visibility IGP level (e.g., Level 2), the router spanning the IGP levels may re-originate the advertisement in the higher-visibility IGP level. Thus, routers in the higher-visibility IGP level may receive advertisements originated by routers in the lower-visibility IGP level. For instance, in the example of FIG. 1, if router 12C receives an advertisement originated by router 12B, router 12C forwards the advertisement to router 12D. However, the converse is typically not true. That is, when a router spanning a higher-visibility IGP level and a lower-visibility IGP level receives an advertisement originated by a router in the higher-visibility IGP level, the router typically does not forward the advertisement to routers in the lower-visibility IGP level. For instance, in the example of FIG. 1, if router 12C receives an advertisement originated by router 12D, router 12C does not forward the advertisement to router 12B.

Although a router spanning a higher-visibility IGP level and a lower-visibility IGP level typically does not forward advertisements originated in the higher-visibility IGP level to routers in the lower-visibility IGP level, an administrator may configure the router to do so, at least for some prefixes. This disclosure may refer to the act of forwarding an advertisement from a higher-visibility IGP level to a lower-visibility IGP level as "leaking" the prefix specified by the advertisement from the higher-visibility IGP level to the lower-visibility IGP level.

After installing a route as an active route, a router may receive a packet. In response to receiving the packet, the router may determine whether a stack of one or more labels is attached to the packet. The stack of labels comprises an ordered sequence of labels. If there is no stack of labels attached to the packet when the router receives the packet or if there are no remaining labels attached to the packet after the router removes the active label, the router forwards the packet to another node in network 100 without further use of segment routing. For instance, the router may forward the packet according to an IP address of the packet.

However, if the stack of labels still includes one or more labels, the router may determine a next hop of a route associated with the active label of the stack. The active label may be the label at the "top" of the stack. For instance, the active label may be the label occurring first in an ordered sequence of labels attached to the packet. If the next hop of the route associated with the active label advertised the active SID, the router may remove the active label from the stack of labels attached to the packet, potentially leaving one or more labels remaining attached to the packet. In other words, the router may "pop" the active label from the stack. For example, if router 12D is assigned the SID "1063" and router 12C receives a packet with the following labels attached, "1063" and "1040", router 12C may remove the label "1063" from the packet and leave the label "1040" attached to the packet.

The router may then forward the packet, along with the remaining labels of the stack, to a next hop on the route associated with the active label. For example, suppose router 12D advertised a prefix equal to 2.2.2.33/32 and a SID equal to "1063." In this example, router 12F may determine, based on network topology data stored by router 12F, a route to router 12D. In this example, the determined route may go from router 12F to router 12G to router 12D. Additionally, in this example, router 12F may associate the determined route with the SID "1063." Subsequently, assuming that router 12F was not itself assigned the SID "1063," if router 12F receives a packet with an active label equal to "1063," router 12F may forward the packet to router 12G. Router 12G performs a similar process to forward the packet to router 12D.

This system may allow a source node, such as ingress router 12A, to control the path a packet takes through network 10. For example, suppose ingress router 12A is configured to send a packet to egress router 12H via a route through router 12G and router 12D. Furthermore, in this example, let router 12G be assigned the SID "1063" and let router 12D be assigned the SID "1062." Accordingly, in this example, ingress router 12A may receive an advertisement specifying a prefix of router 12G and the SID "1063." Ingress router 12A then determines a route through routers 12E and 12F to router 12G and associates the determined route with SID "1063." In this example, ingress router 12A may push the label "1062" onto a stack of labels attached to the packet and may then push the label "1063" onto the stack of labels attached to the packet. Ingress router 12A then sends the packet to a next hop on the route associated with the label "1063" (i.e., router 12E). Router 12E and router 12F forward the packet in turn to router 12G based on the label "1063." Because label "1063" matches the SID assigned to router 12G, router 12G removes the label "1063," leaving behind the label "1062." Router 12G then determines a route associated with the label "1062." In this example, the route associated with the label "1062" goes to router 12D because router 12G received an advertisement that associates a prefix of router 12D with the label "1062." Thus, ingress router 12A is able to force the packet to go through routers 12G and 12D on the packet's way to router 12H, even though a shortest path from router 12A to router 12H might actually go through routers 12B, 12C, and 12D.

However, there are situations where a router (e.g., any of routers 12) receives conflicting advertisements. For example, a router may receive a first advertisement that specifies a first prefix and a SID and the router may subsequently receive a second advertisement that specifies a second, different prefix and the same SID. In other words, there may be a case where the two different prefixes by different originators are associated with the same SID. In the example of FIG. 1, this type of conflict may occur if router 12D and router 12G advertise different prefixes (e.g., 2.2.2.33/32 and 1.1.1.66332, respectively) and the same SID (e.g., 1063). This type of conflict may be a service-impacting conflict because, essentially, one of the prefixes is missing a SID configuration. However, routers 12 may salvage some traffic by consistently choosing one of the prefixes to which to install labeled routes.

In another example, a router may receive a first advertisement that specifies a prefix and a first SID and the router may subsequently receive a second advertisement that specifies the same prefix and a second, different SID. In other words, there may be a case where the same prefix by different originators is associated with different SIDs. In the example of FIG. 1, this type of conflict may occur if router 12B and router 12E advertise the same prefix (e.g., 1.1.1.41/32), but different SIDs (e.g., "1041" and "1040"). This type of conflict is typically not a service-impacting conflict as labeled routing and forwarding may still be possible if all routers consistently choose one of the SIDs for forwarding labeled traffic to the prefix.

Such conflicting advertisements may occur for a variety of reasons. For example, the prefixes and SIDs may be set by manual configuration. Since these configurations are manual, the configurations are prone to errors and may lead to such conflicts.

When a router receives a conflicting advertisement, the router may perform a conflict resolution procedure. Ginsberg et al., "Segment Routing Conflict Resolution draft-ietf-spring-conflict-resolution- 03.txt," Apr. 27, 2017 describes various rules for resolving prefix and SID conflicts.

However, security risks may arise in SID conflicts in a network, such as network 10, that comprises a hierarchy of IGP levels. For example, suppose router 12A, in Level 1, advertises a first prefix and a SID. In this example, suppose router 12B, in Level 1, advertises a second, different prefix and the same SID, where the second prefix is less than the first prefix. In this example, conflict resolution rules may provide that, because the second prefix is less than the first prefix, routers 12 install only labeled routes to the second prefix.

However, suppose that router 12A, in Level 1, advertises a first prefix (e.g., 1.1.1.10/32) and a SID (e.g., "1010") and router 12D, in Level 2, advertises a second prefix (e.g., 1.1.1.3/32) and the same SID (e.g., "1010"). In this example, the second prefix (e.g., 1.1.1.3/32) is less than the first prefix (e.g., 1.1.1.10/32). Level 1 routers, such as router 12A, typically do not have any Level 2 link-state databases or prefixes. Hence, in response to these advertisements, Level 1 routers (e.g., routers 12B and 12E) install labeled routes to router 12A associated with the SID. However, consider routers that span Level 1 and Level 2 (i.e., L1-L2 routers), such as routers 12C and 12F. The L1-L2 routers may direct packets with active labels equal to the SID to router 12D instead of router 12A because router 12D also advertised the SID. Thus, by advertising the same SID as a router in a lower-visibility level of network 10, router 12D may be able to redirect traffic intended for router 12A to itself. This may pose a significant security risk because router 12D may be able to access packets that were not intended for router 12D and because router 12D may be able to disrupt legitimate packet flows to router 12A simply by advertising the same SID as router 12A. Moreover, because router 12A does not receive advertisements originated by routers in Level 2, router 12A is not alerted to the conflict.

In accordance with a technique of this disclosure, it is noted that all Level 1 routers typically only have access to prefixes from Level 1 and Level 2 routers have access to prefixes from both Level 1 and Level 2. Additionally, Level 2 routers have access to prefixes from Level 1 that are re-originated prefixes. Given these inputs, L1-L2 routers (e.g., routers 12C, 12F) may implement the following rule: In the case of a SID conflict, L1-L2 routers should install labeled routers to the prefix that has the least visibility. L1-L2 routers should apply this rule regardless of whether the prefix specified by the advertisement originated by the higher-visibility IGP level is less than the prefix specified by the advertisement originated by the lower-visibility IGP level. Consistent application of this rule may prevent a router in the higher-visibility IGP level from directing traffic to itself by advertising a SID without detection by a router in a lower-visibility IGP that previously advertised the same SID.

Hence, in one example in accordance with this technique, a first router (e.g., router 12C or router 12F) in a network (e.g., network 10) may receive a first advertisement originated by a second router (e.g., router 12A, router 12B, or router 12E) in a first IGP level (e.g., Level 1) of the network. In this example, the first advertisement specifies a first prefix and a SID. Additionally, in this example, the first router may receive a second advertisement originated by a third router (e.g., router 12D, router 12H, or router 12G) in a second IGP level (e.g., Level 2) of the network. In this example, the second advertisement specifies a second prefix and the SID. Furthermore, in this example, the first router determines a route to the first prefix. The first router may also determine a route to the second prefix. In this example, based on the first advertisement and the second advertisement specifying different prefixes and the same SID, and based on the first IGP level having less visibility than the second IGP level, the first router selects the SID to be associated with the route to the first prefix instead of the SID being associated with a route to the second prefix. The first router may then generate data associating the SID with the route to the first prefix. In this example, the first router may install, as an active route, the route to the first prefix.

As discussed above, an administrator may configure a router spanning two different IGP levels to leak certain prefixes from a higher-level IGP level to a lower-level IGP level. For instance, in some topologies, administrators may leak certain Level 2 prefixes to Level 1 via explicit policy. When prefixes are leaked from Level 2 to Level 1, the IS-IS protocol mandates that a 'DOWN' bit be set. To handle the case where prefixes are leaked from Level 2 to Level 1, the conflict resolution algorithm should add the following preference rule: L1 internal routes should be preferred over L1 routes with DOWN bit (routes which are leaked from L2).

Thus, in one example, a first router (e.g., any of routers 12A, 12B, 12E) in a network (e.g., network 10) may receive a first advertisement originated by a second router (e.g., router 12A, router 12B, or router 12E) in a first IGP level (e.g., Level 1) of the network. In this example, the first advertisement specifies a first prefix and a SID. Additionally, in this example, the first router may receive a second advertisement originated by a third router (e.g., router 12D, router 12H, or router 12G) in a second IGP level (e.g., Level 2) of the network. In this example, the second advertisement specifies a second prefix and the SID. Thus, in this example, the second prefix is leaked from the second IGP level to the first IGP level. Furthermore, in this example, the first router determines a route to the first prefix. The first router may also determine a route to the second prefix. In this example, based on the first advertisement and the second advertisement specifying the same SID and based on the second prefix having been leaked from the second IGP level and the first prefix not having been leaked from the second IGP level, the first router selects the SID to be associated with the route to the first prefix instead of the SID being associated with a route to the second prefix. In some examples, the first router may determine that the second prefix is leaked from the second IGP level by determining, based on a DOWN bit of the third advertisement being set, that the third prefix is leaked from the second IGP level. Similarly, the first router may determine that the first prefix is not leaked from the second IGP level by determining, based a DOWN bit of the first advertisement not being set, that the first prefix is not leaked from the second IGP level.

In some examples of this disclosure, a router that spans IGP levels of a network (e.g., an L1-L2 router) may take note of the IGP levels from which conflicting advertisements are detected. If the conflicts are across an IGP domain hierarchy (e.g., conflicting advertisements are received from different IGP levels), the router may specifically log the conflict. For instance, the router may store information recording the conflict. Additionally, routers in the IGP level with broader visibility (e.g., Level 2 of FIG. 1) may log data noting if a conflicting SID is re-originated from a different level.

Another type of conflict may arise when a router receives two advertisements that specify the same prefix and different SIDs. For example, consider IS-IS as the IGP in the following scenario. In this example, router 12B originates an advertisement specifying a prefix and a first SID. Additionally, in this example, router 12C originates an advertisement specifying the same prefix and a second, different SID. In this example, the second SID is less than the first SID. In some cases, labeled routes with the prefix may be installed using the first SID because the first SID is greater than the second SID. This conflict resolution procedure may work well in a non-hierarchical network because there may be no service impact.

However, consider the following example: Router 12A in Level 1 originates an advertisement specifying a prefix (e.g., 1.1.1.30/32) and a first SID (e.g., "1010"). In this example, router 12D in Level 2 originates an advertisement specifying the same prefix (e.g., 1.1.1.30/32) and a second, different SID (e.g., "1003"). Again, in this example, the second SID is less than the first SID. In this example, because Level 1 routers (i.e., router 12B, router 12E) do not have Level 2 link-state databases or corresponding prefix advertisements, the Level 1 routers install labeled routes to router 12A using the first SID. However, a Level 2 router (e.g., router 12D, router 12G, router 12H) installs labeled routes to router 12D using the second SID because the second SID is less than the first SID. As a result, if a packet forward by a Level 2 router reaches an L1-L2 router (e.g., router 12C, router 12F), the L1-L2 router forwards the packet to router 12A as per the preference rules in IS-IS. However, because this packet has the second SID, the L1 routers will drop the packet because the L1 routers do not have any installed routes associated with the second SID. Thus, legitimate packets destined for router 12D may effectively vanish if the packets happen to pass through an L1-L2 router. As routes change due to various events (e.g., network congestion), L1-L2 routers may be included or excluded from a route to router 12D. As a result, packets may be dropped in ways that are difficult to predict.

A technique of this disclosure addresses this challenge. It is noted that all routers in a lower-visibility IGP level (e.g., Level 1) typically only have access to prefixes advertised by routers in their own level, whereas routers in a higher-visibility IGP level (e.g., Level 2) have access to prefixes advertised by routers in both the higher-visibility IGP level and the lower-visibility IGP level. Additionally, routers in the higher-visibility IGP level may have access to prefixes from the lower-visibility IGP level that are re-originated prefixes. Given this, routers may apply the following rule: In the case of a prefix conflict, labeled routes should use the SID from the level that has the least network visibility to program ingress and transit routes. This rule applies regardless of whether the SID specified by the advertisement originated from the higher-visibility IGP level is less than the SID specified by the advertisement originated from the lower-visibility IGP level.

Hence, in one example in accordance with the techniques of this disclosure, a first router (e.g., router 12C, router 12F) in a network (e.g., network 10) may receive a first advertisement originated by a second router in a first IGP level of the network. The first advertisement specifies a first prefix and a first SID. Additionally, the first router receives a second advertisement originated by a third router in a second IGP level of the network. The second advertisement specifies a second prefix and a second SID. In this example, the second SID is different from the first SID. Furthermore, in this example, the first router determines a route to the first prefix. In this example, based on the first prefix being equal to the second prefix and based on the first IGP level having less visibility than the second IGP level, the first router selects the first SID as being associated with the route to the first prefix instead of the second SID being associated with the route to the first prefix. Additionally, the first router generates data associating the first SID with the route to the first prefix. The first router may install, as an active route, the route to the first prefix.

In accordance with a technique of this disclosure, when a prefix conflict occurs (i.e., when a router receives two advertisements specifying the same prefix and different SIDs), a router that spans two IGP levels (e.g., an L1-L2 router) may note levels from which conflicting advertisements are detected. If the prefix conflict is across the IGP hierarchy, the router may specifically log the prefix conflict (e.g., using information in addition to regular logging used by the router in the event of intra-area/level conflicts). In some examples, routers in a higher-visibility IGP level (e.g., Level 2) log data indicating for a prefix conflict is re-originated from a lower-visibility IGP level (e.g., Level 1).

As discussed above, an administrator may configure a router spanning two different IGP levels to leak certain prefixes from a higher-level IGP level to a lower-level IGP level. For instance, in some topologies, administrators may leak certain Level 2 prefixes to Level 1 via explicit policy. To handle the case where prefixes are leaked from Level 2 to Level 1, the conflict resolution algorithm should add the following preference rule: Level 1 internal routes should be preferred over Level 1 routes with DOWN bit (routes which are leaked from L2).

Thus, in one example, a first router (e.g., router 12A, router 12B, router 12E) in a network (e.g., network 10) may receive a first advertisement originated by a second router in a first IGP level of the network. The first advertisement specifies a first prefix and a first SID. Additionally, the first router receives a second advertisement originated by a third router in a second IGP level of the network. The second advertisement specifies a second prefix and a second SID. In this example, the second SID is different from the first SID. In this example, the second prefix is leaked from the second IGP level to the first IGP level. Furthermore, in this example, the first router determines a route to the first prefix. In this example, based on the first prefix being equal to the second prefix and based on the second prefix having been leaked from the second IGP level and the first prefix not having been leaked from the second IGP level, the first router selects the first SID as being associated with the route to the first prefix instead of the second SID being associated with the route to the first prefix. Additionally, the first router generates data associating the first SID with the route to the first prefix. The first router may install, as an active route, the route to the first prefix.

Another type of conflict may arise when migrating a networking domain from one IGP to another IGP (e.g., from OSPF to IS-IS, or vice versa). When migrating a networking domain from a first IGP to a second IGP, the following operational steps are commonly used:
1. Configure the second IGP to carry the same routing information, albeit with a less preferred administrative distance.
2. Verify that the corresponding routes are the same for both IGPs.
3. Promote the second IGP's administrative distance to a higher preference so that the second IGP becomes the active route.

Administrative distance is a number of arbitrary unit assigned to dynamic routes, static routes and directly-connected routes. The administrative distance is used by vendor-specific routers to rank routes from most preferred (low administrative distance value) to least preferred (high administrative distance value).

Not accounting for the administrative distance of a protocol when dealing with SID conflicts arising from different protocols could result in the conflict resolution algorithm picking the prefix with the lower preference as the winner. For example, suppose an administrator is migrating a networking domain from a first IGP to a second IGP and the second IGP has a better administrative distance than the first IGP. In this example, a first router may use the first IGP to originate an advertisement that specifies a first prefix and a SID. In this example, a second router may use the second IGP to originate an advertisement that specifies a second, different prefix and the same SID. In this example, the first prefix is less than the second prefix. In this situation, a router may associate the route to the first prefix with the SID based on the first prefix being less than the second prefix. In this example, the router does not install a route to the second prefix associated with the SID. Thus, the transit route for the SID is toward the first prefix. However, this may not be the preferred outcome in a situation where an administrator wants to migrate from the first IGP to the second IGP.

A technique of this disclosure may address this challenge. For example, in the case where SID conflicts occur between two different protocol prefixes, a conflict resolution algorithm should add the following preference rule: the prefix with the more preferred protocol should be picked. In other words, a prefix with a protocol with a lower administrative distance should be picked over a prefix with a protocol with higher administrative distance.

Hence, in one example in accordance with the techniques of this disclosure, a first router (e.g., any of routers 12) in a network (e.g., network 12) may receive a first advertisement originated by a second router of the network. The first advertisement specifies a first prefix and a SID. Additionally, the first router may receive a second advertisement originated by a third router of the network. The second advertisement specifies a second prefix and the same SID. Additionally, in this example, the first router may determine a route to the first prefix. Based on the first advertisement and the second advertisement specifying the same SID and based on the first routing protocol being associated with a lower administrative distance than the second routing protocol, the first router may select the SID to be associated with the route to the first prefix instead of the SID being associated with a route to the second prefix. Furthermore, in this example, the first router may generate data associating the SID with the route to the first prefix. The first router may then install, as an active route, the route to the first prefix.

The examples of this disclosure may be used together or separately.

Figure 2:
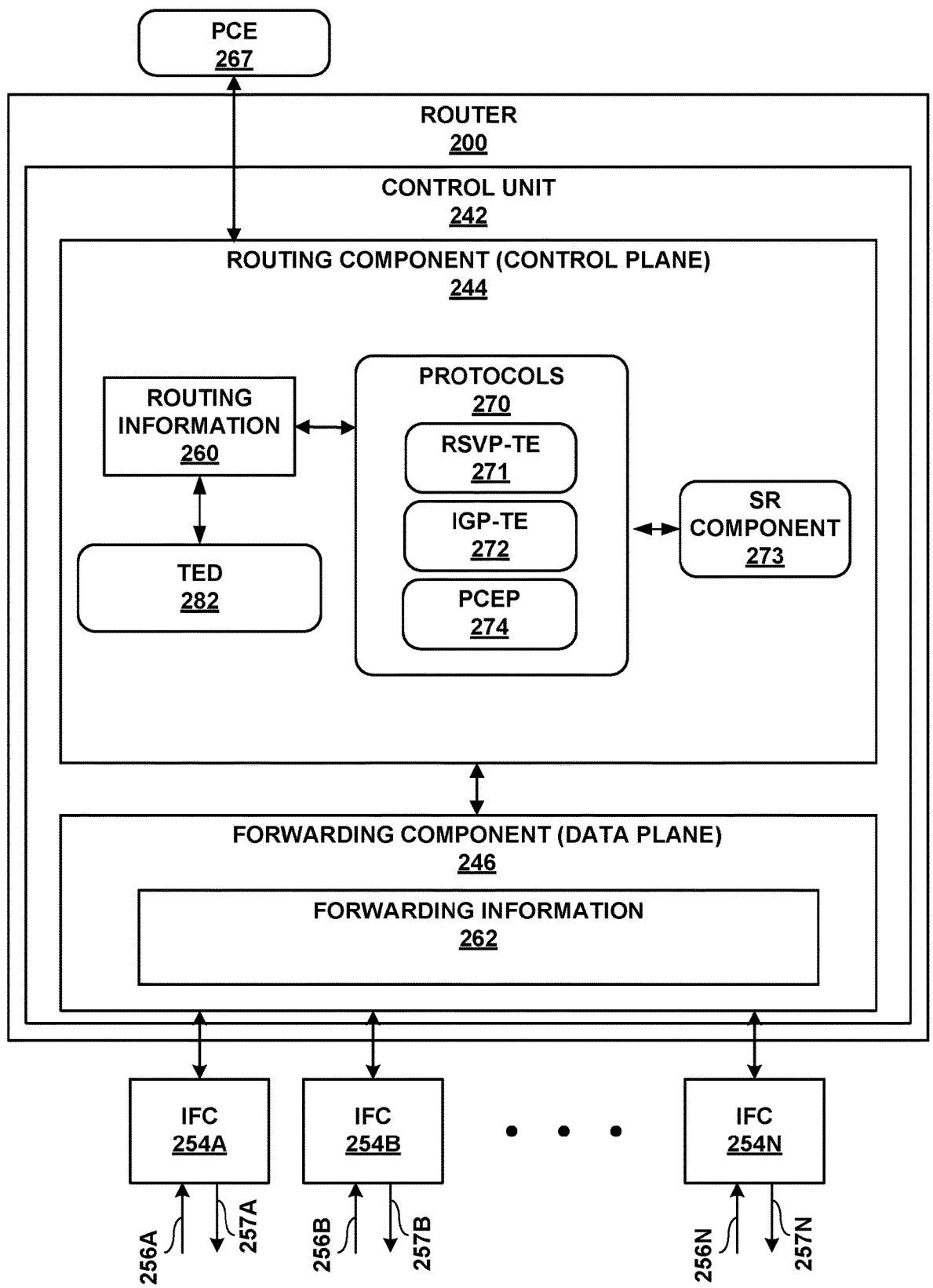
FIG. 2 is a block diagram illustrating an example controller capable of operating in accordance with the techniques described herein.

FIG. 2 is a block diagram illustrating an example router 200 that performs various aspects of the techniques described in this disclosure. Router 200 may represent any of routers 12 of FIG. 1. While described with respect to router 200, the techniques may be implemented by any other type of network device capable of implementing at least routing protocols including a resource reservation protocol or segment routing protocol. Thus, while described with respect to router 200, the techniques should not be limited to router 200 described with respect to the example of FIG. 2.

Figure 4:
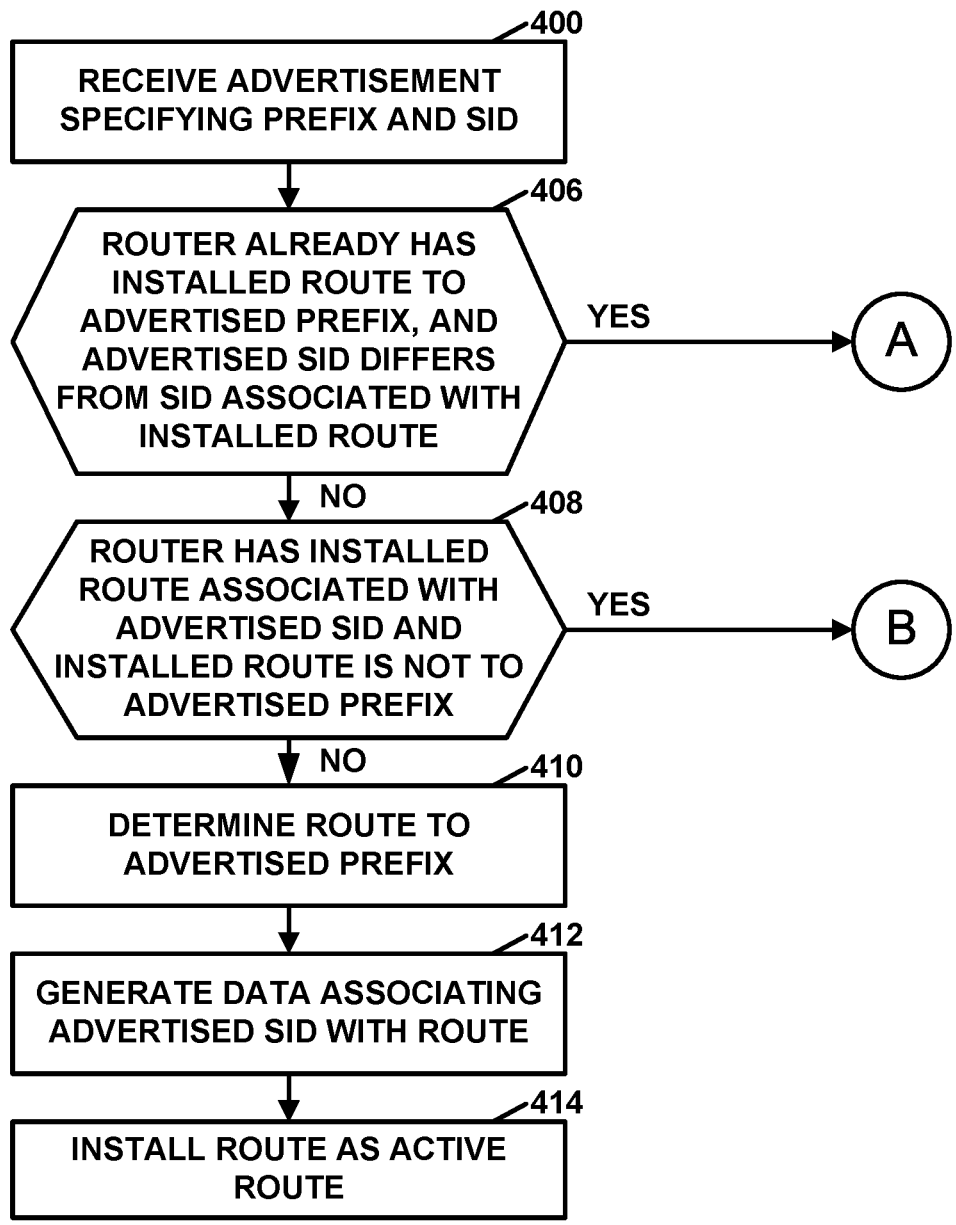
FIG. 4 is a flowchart illustrating an example operation of a router in response to receiving an advertisement, in accordance with one or more techniques of this disclosure.

In the example of FIG. 4, router 200 includes interface cards 254A-254N ("IFCs 254") that receive and send data units, such as packet flows, via network links 256A-256N and 257A-257N, respectively. Router 200 may include a chassis (not shown) having a number of slots for receiving a set of cards, including IFCs 254. Each card may be inserted into a corresponding slot of the chassis for electrically coupling the card to routing component 244 via high-speed switch (not shown), which may comprise, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 200 may interface with links of a network.

In general, router 200 may include a control unit 242 that determines routes of received packets and forwards the packets accordingly via IFCs 254. In the example of FIG. 2, control unit 242 includes routing component 244 (control plane) that configures and controls packet forwarding operations applied by forwarding component 246 (data plane).

Routing component 244 provides an operating environment for various routing protocols 250 that execute at different layers of a network stack. Routing component 244 is responsible for the maintenance of routing information 260 to reflect the current topology of a network and other network entities to which router 200 is connected. In particular, routing protocols periodically update routing information 260 to accurately reflect the topology of the network and other entities based on routing protocol messages received by router 200. The protocols may be software processes executing on one or more processors. For example, routing component 244 includes network protocols that operate at a network layer of the network stack, which are typically implemented as executable software instructions.

In the example of FIG. 2, protocols 270 may include Resource Reservation Protocol with Traffic Extensions (RSVP-TE) protocol 271 to establish RSVP-TE LSPs (e.g., RSVP LSP 26 of FIG. 1). For example, routing component 244 may use RSVP-TE 471 to generate and send Path and Resv messages for establishing RSVP LSPs.

Protocols 270 may also include IGP-TE component 272 to implement an IGP protocol with traffic engineering extensions to exchange link state information, and facilitate forwarding of packets or other data units between endpoint devices. In some examples, IGP-TE component 272 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-1sa-extend-01.txt. In some examples, IGP-TE component 272 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990. IGP-TE component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt. In some examples, router 200 may include both an OSPF component and an IS-IS component.

Protocols 270 may also include configuration protocols. For example, protocols 270 may include PCEP 274 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples, PCE 267 or central controller may configure router 200 with SIDs via PCEP 274 or a NETCONF component (not shown). Protocols 270 may include other routing protocols (not shown), such as routing information protocol (RIP), border gateway protocol (BGP), or other network protocols.

Routing component 244 includes a segment routing (SR) component 273 to implement segment routing techniques for IGP protocols (e.g., IS-IS and OSPF) for specifying how router 200 may advertise node or adjacency labels. As described in FIG. 1, these node or adjacency labels may steer a packet through a controlled set of instructions, called segments, by prepending the packet with a segment routing header.

By executing the routing protocols, routing component 244 identifies existing routes through the network and determines new routes through the network. Routing component 244 stores routing information 260 that includes, for example, known routes through the network. Forwarding component 246 stores forwarding information 262 that includes destinations of output links 257. Forwarding information 262 may be generated in accordance with routing information 260.

Routing component 244 may include a Traffic Engineering Database (TED) 282 for storing e.g., path information for resource reservation LSPs or segment routed LSPs. In some examples in which router 200 supports segment routing (e.g., SPRING), TED 282 may include segment identifier information. TED 282 may be in the form of a variety of data structures, such as a number of tables, link lists, radix trees, databases, flat files, or other data structures.

In accordance with the techniques described in this disclosure, IFCs 254 may be configured to receive advertisements and forward packets as described elsewhere in this disclosure. Furthermore, control unit 242 may be configured to perform the conflict resolution procedures described elsewhere in this disclosure. For example, SR component 273 may receive advertisements and perform conflict resolution procedures. For instance, SR component 273 may resolve SID conflicts and prefix conflicts in accordance with examples provided elsewhere in this disclosure. In some examples, SR component 273 may be part of IGP-TE component 272.

Although described for purposes of example with respect to a router, router 200 may be more generally a network device having routing functionality, and need not necessarily be a dedicated routing device. The architecture of router 200 illustrated in FIG. 2 is shown for example purposes only. The techniques of this disclosure are not limited to this architecture. In other examples, router 200 may be configured in a variety of ways. In one example, some of the functionally of control unit 242 may be distributed within IFCs 254. In another example, control unit 242 may comprise a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

Figure 3:
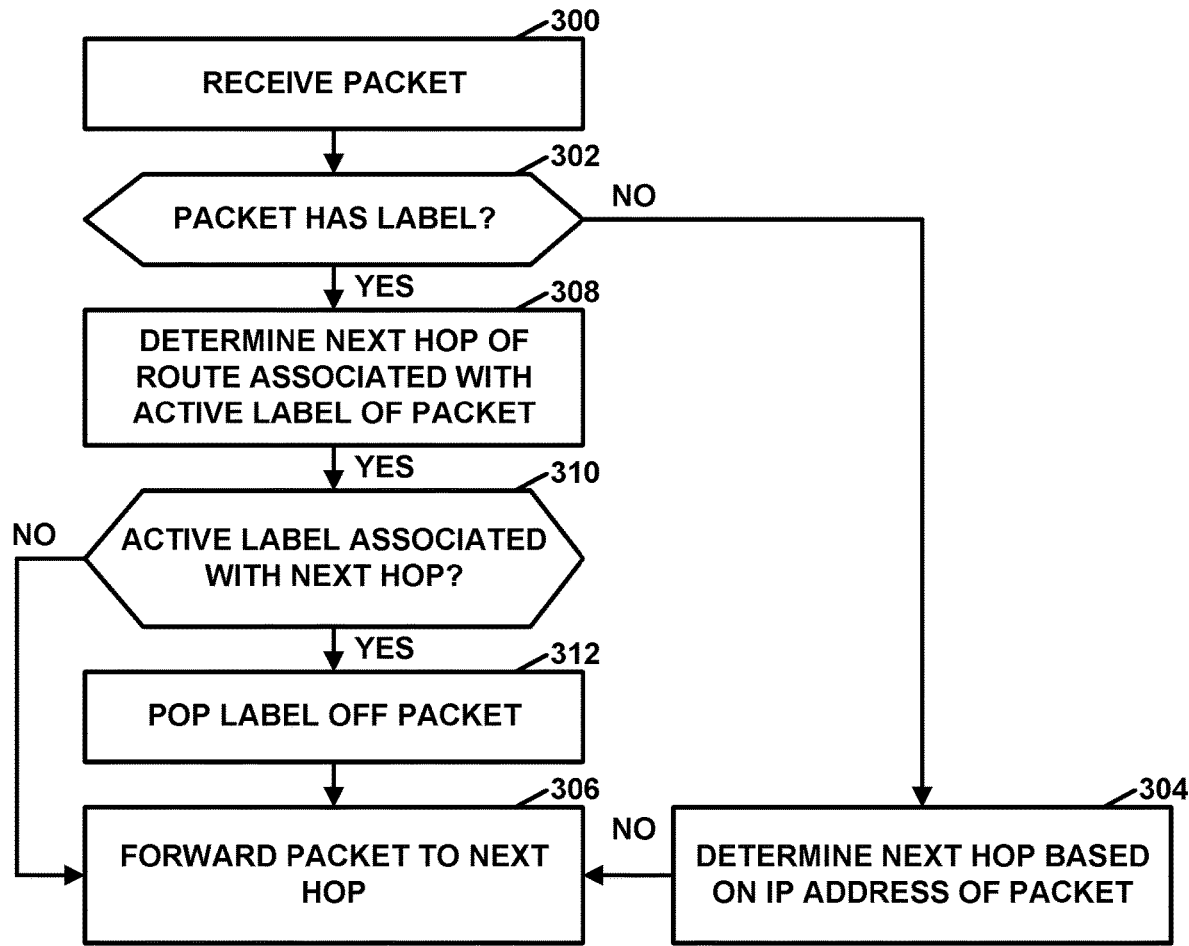
FIG. 3 is a flowchart illustrating an example operation of a router in response to receiving a packet.

FIG. 3 is a flowchart illustrating an example operation of a router in response to receiving a packet. The flowcharts of this disclosure are provided as examples. Other examples in accordance with the techniques of this disclosure may include more, fewer, or different actions and/or may perform actions in different orders or in parallel.

In the example of FIG. 3, a current router (e.g., any of routers 12 (FIG. 1) or router 200 (FIG. 2)) may receive a packet (300). In response to receiving the packet, the current router may determine whether the packet has a label (302). In response to determining the packet does not have a label ("NO" branch of 302), the current router may determine a next hop for the packet based on an IP address or other indicia of the packet (304). The current router may then forward the packet to the next hop (306).

However, in response to determining the packet has a label ("YES" branch of 302), the current router may determine a next hop of a route associated with an active label of the packet (308). Additionally, the current router may determine whether the active label is associated with the next hop (310). For instance, the current router may use stored routing information to determine whether the active level is associated with the next hop. In response to determining that the active label is associated with the next hop ("YES" branch of 310), the current router may pop the active label off the packet (312). After popping the label off the packet or in response to determining that the active label is not associated with the next hop ("NO" branch of 310), the current router may forward the packet to the next hop (306).

FIG. 4 is a flowchart illustrating an example operation of a router in response to receiving an advertisement, in accordance with one or more techniques of this disclosure. In the example of FIG. 4, a router (e.g., any of routers 12 (FIG. 1) or router 200 (FIG. 2)) receives an advertisement specifying a prefix and a SID (400). For example, one or more of IFCs 254 (FIG. 2) may receive the advertisement. The advertisement may be formatted according to an IGP, such as IS-IS or OSPF. In the context of FIG. 4, this disclosure refers to the prefix specified by the advertisement as the advertised prefix and refers to the SID specified by the advertisement as the advertised SID. In some examples, in response to receiving the advertisement, the router may determine whether the router has an installed route to the advertised prefix that is associated with the advertised SID. In this case, the advertisement may be a duplicate of a previously-received advertisement. Accordingly, in response to determining that the router already has an installed route to the advertised prefix that is associated with the advertised SID, the router may ignore the advertisement.

The router may determine whether the router already has an installed route to the advertised prefix, and the advertised SID does not match a SID associated with the installed route to the advertised prefix (406). In this case, there is a prefix conflict. Thus, when the router determines the router already has an installed route to the advertised prefix and the advertised SID does not match the SID associated with the installed route to the advertised prefix ("YES" branch of 406), the router may perform the operation marked "A" in FIG. 4 and shown in FIG. 5.

On the other hand, in response to determining either that the router does not have an installed route to the advertised prefix ("NO" branch of 406), the router may determine whether the router has an installed route associated with the advertised SID and the installed route associated with the advertised SID is not to the advertised prefix (408). In this case, there is a SID conflict. In response to determining that the router has an installed route associated with the advertised SID and the installed route is not to the advertised prefix ("YES" branch of 408), the router may perform the operation marked "B" in FIG. 4 and shown in FIG. 6.

If the advertisement is not duplicative, there is no prefix conflict, and there is no SID conflict, the router may install a route based on the advertisement. Thus, in the example of FIG. 4, in response to determining that the router does not have an installed route associated with the advertised SID ("NO" branch of 408), the router may determine a route to the advertised prefix (410). The router may use previously received topology information (e.g., received via IGP-TE component 272 and stored in routing information 260 or TED 282) to determine the route to the advertised prefix. In addition, the router may generate data associating the advertised SID with the determined route (412). For example, the router may store data in routing information 260 or TED 282 (FIG. 2) indicating that the advertised SID is associated with the route to the advertised prefix. Furthermore, the router may install the route as an active route (414). In some examples, to install the route as an active route, the router may update forwarding information 262 (FIG. 2) such that forwarding component 246 forwards packets having labels equal to the advertised SID to a next hop on the route.

Figure 5:
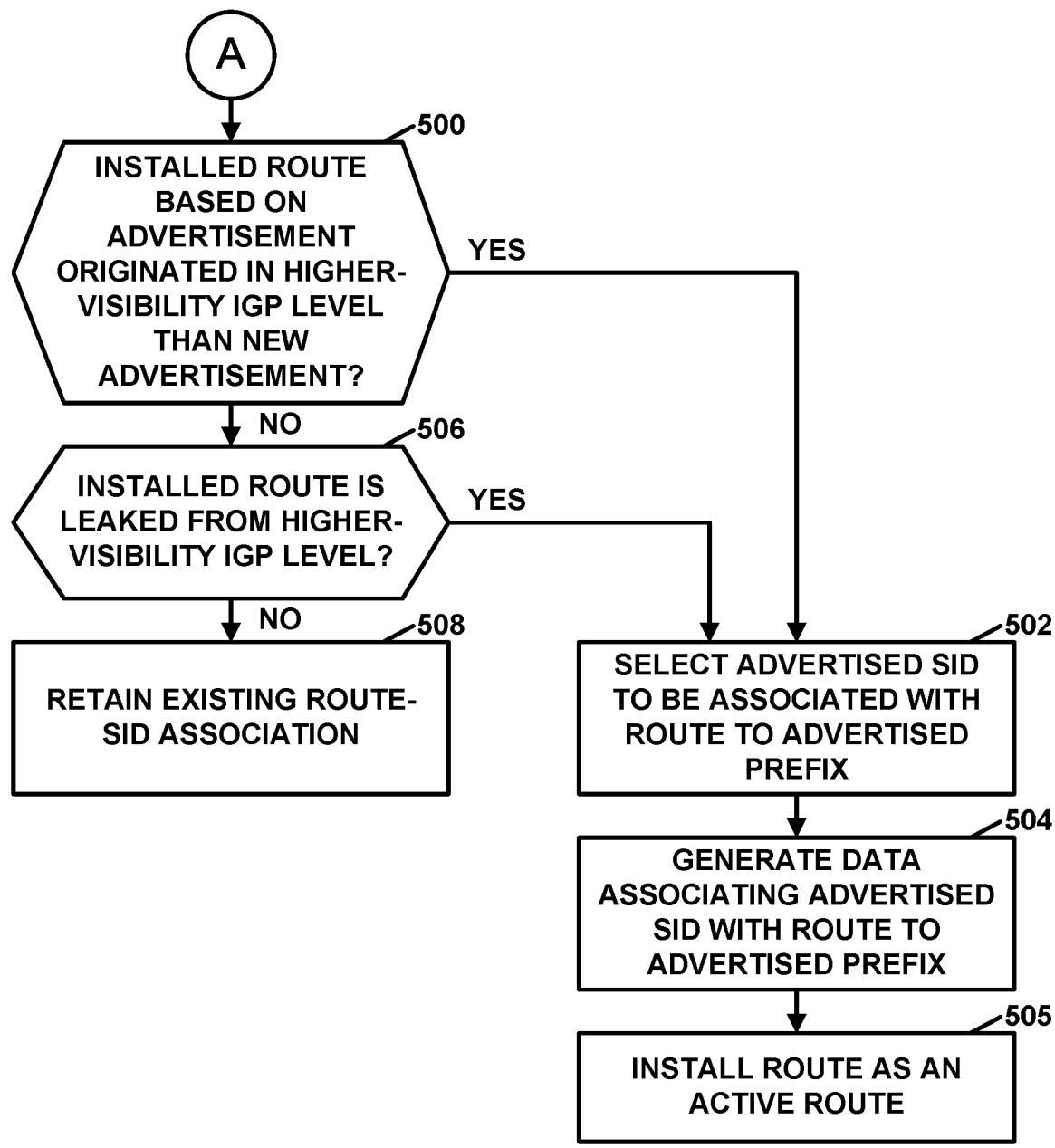
FIG. 5 is a flowchart illustrating an example operation of a router in response to a prefix conflict, in accordance with one or more techniques of this disclosure.

FIG. 5 is a flowchart illustrating an example operation of a router in response to a prefix conflict, in accordance with one or more techniques of this disclosure. With respect to the example of FIG. 5, the advertisement received in action (400) of FIG. 4 is referred to as the "new advertisement." In the example of FIG. 5, the router may determine whether the existing installed route to the advertised prefix is based on an advertisement originated by a router in a higher-visibility IGP level than the new advertisement (500). In some examples, the router may store data indicating IGP levels of routers that originate advertisements received by the router. In such examples, the router may use this information to determine whether the existing installed route to the advertised prefix is based on an advertisement originated by a router in a higher-visibility IGP level than the new advertisement. In response to determining that the installed route to the advertised prefix is based on an advertisement originated by a router in a higher-visibility IGP level than the new advertisement ("YES" branch of 500), the router may select the advertised SID specified by the new advertisement to be associated with the route to the advertised prefix (502). The router may then generate data associating the advertised SID with the route to the advertised prefix (504).

However, in response to determining the installed route to the advertised prefix is not based on an advertisement that originated in a higher-visibility IGP level than the new advertisement ("NO" branch of 500), the router may determine whether the installed route to the advertised prefix is leaked from a higher-visibility IGP level than an IGP level to which the router belongs (506). In response to determining that the installed route to the advertised prefix is leaked from a higher-visibility IGP level than the IGP level to which the router belongs ("YES" branch of 506), the router may select the advertised SID specified by the new advertisement to be associated with the route to the advertised prefix (502). The router may then generate data associating the advertised SID with the route to the advertised prefix (504) and install the route to the advertised prefix as an active route (505).

In response to determining the installed route to the advertised prefix is not leaked from a higher-visibility IGP level than the IGP level to which the router belongs ("NO" branch of 506), the router may retain the existing route-SID relationship (508).

Figure 6:
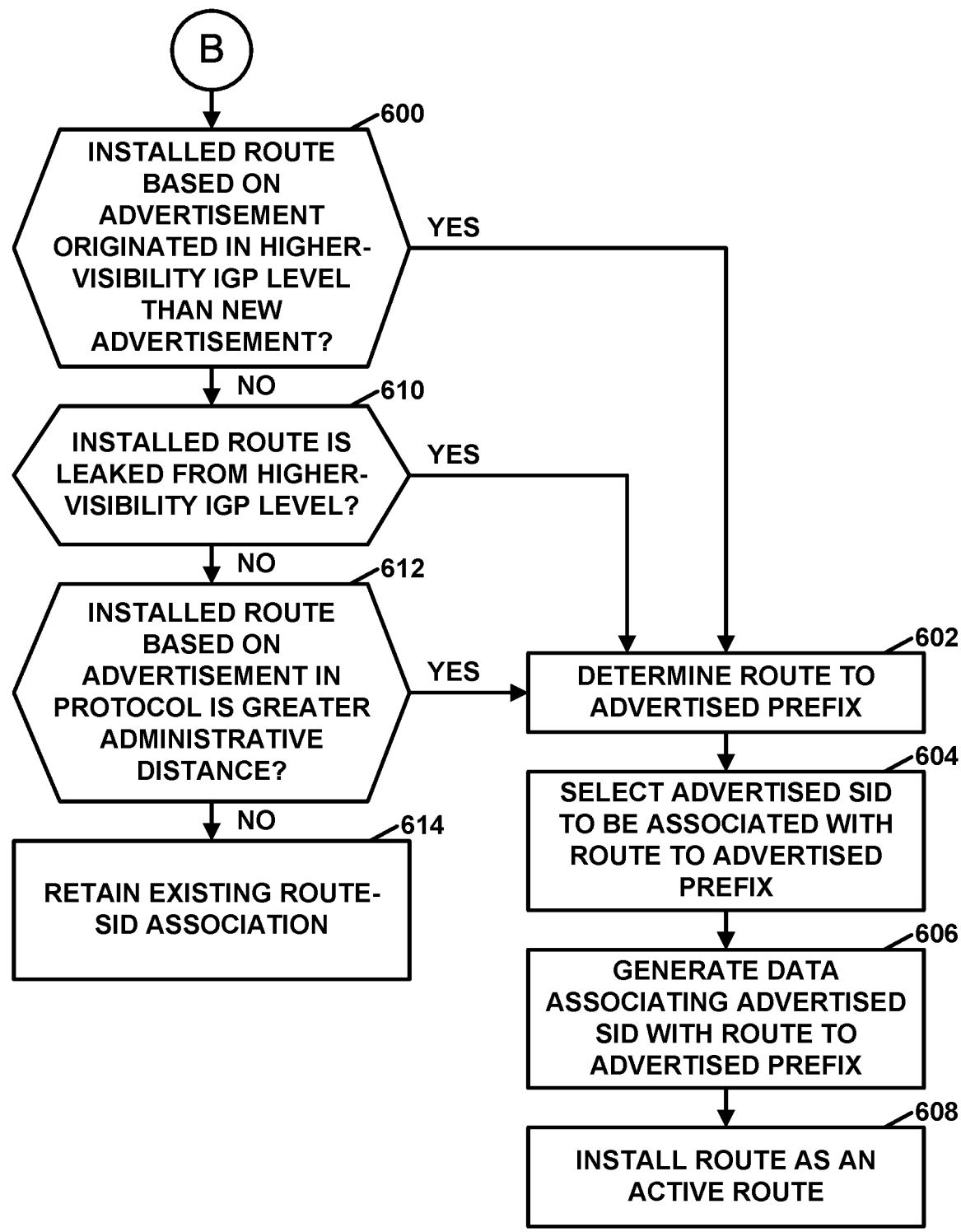
FIG. 6 is a flowchart illustrating an example operation of a router in response to a segment identifier (SID) conflict, in accordance with one or more techniques of this disclosure.

FIG. 6 is a flowchart illustrating an example operation of a router in response to a SID conflict, in accordance with one or more techniques of this disclosure. The router may perform the operation of FIG. 6 in response to determining that the router has an installed route that is associated with the advertised SID and the installed route is not to the advertised prefix. In the example of FIG. 6, the router determines whether the installed route is based on an advertisement that originated in a higher-visibility IGP level than the new advertisement (600). For example, the router may determine based on network topology information stored at the router that the prefix specified by the advertisement corresponds to the higher-visibility IGP level. In response to determining the installed route is based on an advertisement that originated in a higher-visibility IGP level than the new advertisement ("YES" branch of 600), the router may determine a route to the advertised prefix (602). In addition, the router may select the advertised SID to be associated with the determined route to the advertised prefix (604). Furthermore, the router may generate data associating the advertised SID with the route to the advertised prefix (606). For example, the router may store data in routing information 260 (FIG. 2) or a LSDB indicating that the advertised SID is associated with the route to the advertised prefix. The router may install the route as an active route (608). In some examples, to install the route as an active route, the router may update forwarding information 262 (FIG. 2) such that forwarding component 246 forwards packets having the advertised SID to a next hop on the route.

On the other hand, responsive to determining the installed route is not based on an advertisement that originated in a higher-visibility IGP level than the new advertisement ("NO" branch of 600), the router may determine whether the installed route is leaked from a higher-visibility IGP level than the router and the advertised prefix is not leaked from an IGP level having higher visibility than the IGP level to which the router belongs (610). In response to determining that the installed route is leaked from a higher-visibility IGP level than the router and the advertised prefix is not leaked from an IGP level having higher visibility than the IGP level to which the router belongs ("YES" branch of 610), the router may determine a route to the advertised prefix (602). In addition, the router may select the advertised SID to be associated with the determined route to the advertised prefix (604). Furthermore, the router may generate data associating the advertised SID with the route to the advertised prefix (606) and install the route to the advertised prefix as an active route (608).

However, in response to determining that the installed route is not leaked from a higher-visibility IGP level than the router or the advertised prefix is leaked from an IGP level having higher visibility than the IGP level to which the router belongs ("NO" branch of 610), the router may determine whether the installed route associated with the advertised SID is based on an advertisement in an IGP protocol having a greater administrative distance than an IGP protocol to which the new advertisement belongs (612). In response to determining that the installed route associated with the advertised SID is based on an advertisement in an IGP protocol having a greater administrative distance than an IGP protocol to which the new advertisement belongs ("YES" branch of 612), may determine a route to the advertised prefix (602). In addition, the router may select the advertised SID to be associated with the determined route to the advertised prefix (604). Furthermore, the router may generate data associating the advertised SID with the route to the advertised prefix (606) and install the route to the advertised prefix as an active route (608).

However, in response to determining that the installed route associated with the advertised SID is not based on an advertisement in an IGP protocol having a greater administrative distance than the IGP protocol to which the new advertisement belongs ("NO" branch of 612), the router may retain the existing route-SID relationship (614).

Figure 7:
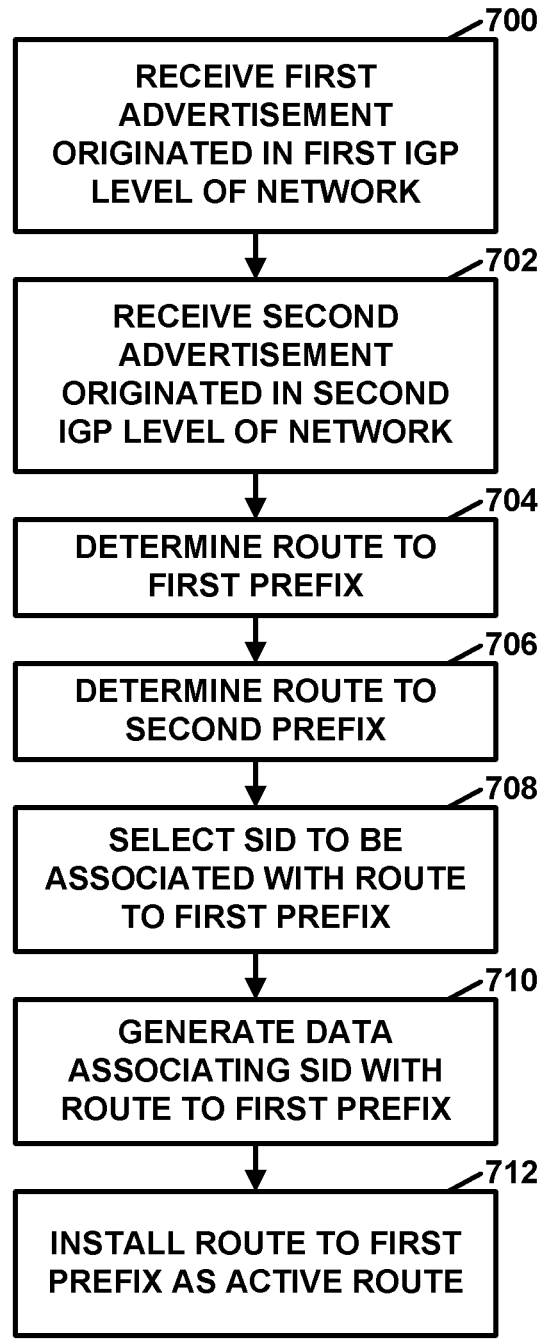
FIG. 7 is a flowchart illustrating an example operation of a router in response to a SID conflict, in accordance with one or more techniques of this disclosure.

FIG. 7 is a flowchart illustrating an example operation of a router in response to a SID conflict, in accordance with one or more techniques of this disclosure. The actions in the operation of FIG. 7 may correspond to actions in two runs through the flowcharts of FIGS. 4 and 5. The example operation of FIG. 7 may be performed by any of routers 12 (FIG. 1) or router 200 (FIG. 2).

In the example of FIG. 7, a first router in a network may receive a first advertisement originated by a second router in a first IGP level of the network (700). The first advertisement specifies a first prefix and a SID. Additionally, the first router receives a second advertisement originated by a third router in a second IGP level of the network (702). The second advertisement specifies a second prefix and the SID. Furthermore, the first router may determine a route to the first prefix (704). The first router may also determine a route to the second prefix (706).

In addition, the first router may perform actions (708)-(712) based on the first advertisement and the second advertisement specifying the same SID and based on the first IGP level having less visibility than the second IGP level. Particularly, the first router may select the SID to be associated with the route to the first prefix instead of the SID being associated with the route to the second prefix (708). The first router may also generate data associating the SID with the route to the first prefix (710). In some examples, based on the first advertisement and the second advertisement specifying the same SID and based on the first IGP level having less visibility than the second IGP level, the first router generates the data associating the SID with the route to the first prefix regardless of the second prefix being less than the first prefix. Additionally, the first router may install, as an active route, the route to the first prefix (712).

After installing the route, the first router may, as described with respect to FIG. 3, receive a packet having a label that specifies the SID. Based on the packet having the label that specifies the SID, based on the data associating the SID with the route to the first prefix and based on the route to the first prefix being an active route, the first router may forward the packet to a next hop on the route to the first prefix.

In some examples, consistent with FIG. 4 and FIG. 5, the first router may receive a third advertisement originated by a third router in the first IGP level. The third advertisement specifies a third prefix and the SID. In this example, the first router may determine that the third prefix is leaked from the second IGP level and that the first prefix is not leaked from the second IGP level (see action 506 of FIG. 5). Responsive to determining that the third prefix is leaked from the second IGP level and the first prefix is not leaked from the second IGP level, the first router may retain the data associating the SID with the route to the first prefix (see action 510 of FIG. 5). In this example, as part of determining that the third prefix is leaked from the second IGP level and that the first prefix is not leaked from the second IGP level comprises, the first router may determine, based on a DOWN bit of the third advertisement being set, that the third prefix is leaked from the second IGP level. Additionally, the first router may determine, based a DOWN bit of the first advertisement not being set, that the first prefix is not leaked from the second IGP level.

In some examples, consistent with FIG. 4 and FIG. 5, the first router may receive a third advertisement originated by a third router in the first IGP level. The third advertisement specifies a third prefix and the SID. The third prefix is different from the first prefix. Additionally, the first router may determine that the third prefix is not leaked from the second IGP level and that the first prefix is leaked from the second IGP level. Furthermore, the first router may determine a route to the third prefix. In this example, responsive to determining that the third prefix is not leaked from the second IGP level, that the first prefix is leaked from the second IGP level, and that the first advertisement and the third advertisement specify the same SID, the first router may select the SID to be associated with the route to the third prefix instead of the SID being associated with the route to the first prefix, and generate data associating the SID with the route to the third prefix (see actions 502 and 504 of FIG. 5). The first router may uninstall, as an active route, the route to the first prefix. The first router may install, as an active route, the route to the third prefix.

Figure 8:
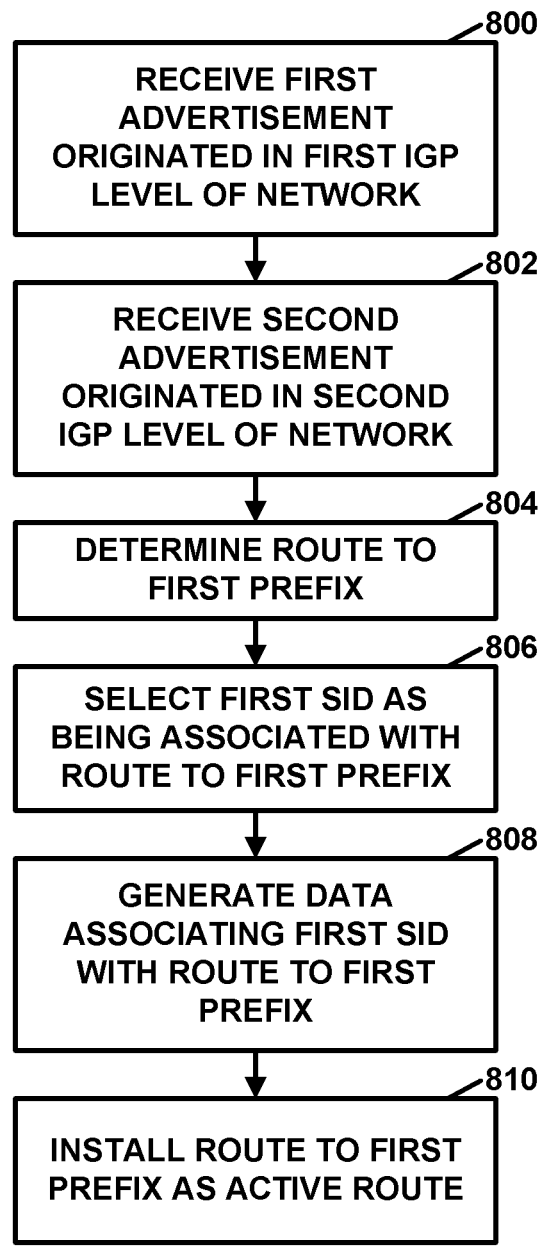
FIG. 8 is a flowchart illustrating an example operation of a router in response to a prefix conflict, in accordance with one or more techniques of this disclosure.

FIG. 8 is a flowchart illustrating an example operation of a router in response to a prefix conflict, in accordance with one or more techniques of this disclosure. The actions in the operation of FIG. 8 may correspond to actions in two runs through the flowcharts of FIGS. 4 and 6. The example operation of FIG. 8 may be performed by any of routers 12 (FIG. 1) or router 200 (FIG. 2).

In the example of FIG. 8, a first router in a network may receive a first advertisement originated by a second router in a first IGP level of the network (800). The first advertisement specifies a first prefix and a first SID. Additionally, the first router receives a second advertisement originated by a third router in a second IGP level of the network (802). The second advertisement specifies a second prefix and a second SID. Furthermore, the first router may determine a route to the first prefix (804).

In addition, the first router may perform actions (806)-(810) based on the first prefix being equal to the second prefix and based on the first IGP level having less visibility than the second IGP level. Particularly, the first router may select the first SID as being associated with the route to the first prefix instead of the second SID being associated with the route to the first prefix (806). The first router may also generate data associating the first SID with the route to the first prefix (808). In some examples, based on the first advertisement and the second advertisement specifying the same prefix and based on the first IGP level having less visibility than the second IGP level, the first router generates the data associating the SID with the route to the first prefix regardless of the second SID being less than the first SID. Additionally, the first router may install, as an active route, the route to the first prefix (810).

After installing the route, the first router may, as described with respect to FIG. 3, receive a packet having a label that specifies the first SID. Based on the packet having the label that specifies the first SID, based on the data associating the first SID with the route to the first prefix and based on the route to the first prefix being an active route, the first router may forward the packet to a next hop on the route to the first prefix.

In some examples, consistent with FIG. 4 and FIG. 6, the first router may receive a third advertisement originated by a third router in the first IGP level. The third advertisement specifies a third prefix and a third SID. In this example, the third prefix is different from the first prefix. Furthermore, the first router may determine that the third prefix is leaked from the second IGP level, that the first prefix is not leaked from the second IGP level, and that the third prefix is equal to the first prefix (see action 608 of FIG. 6). Responsive to determining that the third prefix is equal to the first prefix, the third prefix is leaked from the second IGP level, and the first prefix is not leaked from the second IGP level, the first router may retain the data associating the first SID with the route to the first prefix (see action 610 of FIG. 6). In this example, as part of determining that the third prefix is leaked from the second IGP level and that the first prefix is not leaked from the second IGP level comprises, the first router may determine, based on a DOWN bit of the third advertisement being set, that the third prefix is leaked from the second IGP level. Additionally, the first router may determine, based a DOWN bit of the first advertisement not being set, that the first prefix is not leaked from the second IGP level.

In some examples, consistent with FIG. 4 and FIG. 6, the first router may receive a third advertisement originated by a third router in the first IGP level. The third advertisement specifies a third prefix and a third SID. The third SID is different from the first SID. In this example, the first router may determine that the third prefix is not leaked from the second IGP level, that the first prefix is leaked from the second IGP level, and the third prefix is equal to the first prefix (see action 608 of FIG. 6). Responsive to determining that the third prefix is not leaked from the second IGP level and that the first prefix is leaked from the second IGP level, and the third prefix is equal to the first prefix, the first router may select the third SID to be associated with the route to the first prefix instead of the first SID being associated with the route to the first prefix (see action 604 of FIG. 6). Additionally, in this example, the first router may generate data associating the third SID with the route to the first prefix (see action 606 of FIG. 6).

Figure 9:
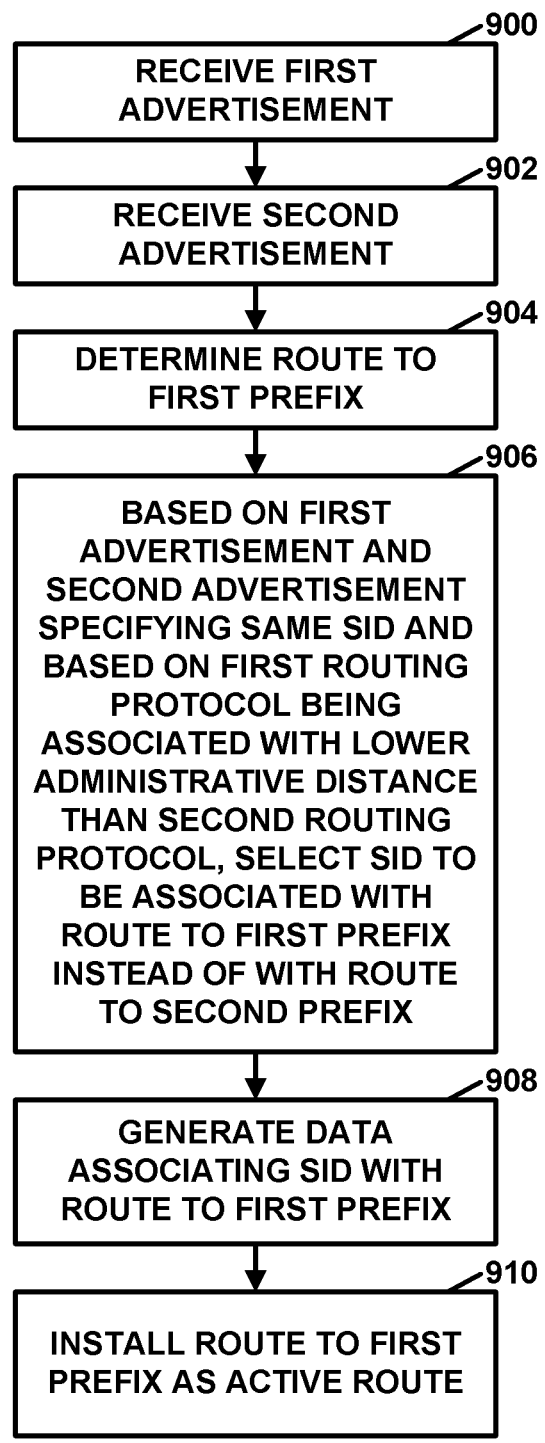
FIG. 9 is a flowchart illustrating an example operation of a router in response to a SID conflict in which multiple Interior Gateway Protocols (IGPs) are used, in accordance with one or more techniques of this disclosure.

FIG. 9 is a flowchart illustrating an example operation of a router in response to a SID conflict in which multiple IGPs are used, in accordance with one or more techniques of this disclosure. The actions in the operation of FIG. 9 may correspond to actions in two runs through the flowcharts of FIGS. 4 and 5. The example operation of FIG. 9 may be performed by any of routers 12 (FIG. 1) or router 200 (FIG. 2).

In the example of FIG. 9, a first router may receive a first advertisement originated by a second router of the network (900). The first advertisement specifies a first prefix and a SID. In addition, the first router receives a second advertisement originated by a third router of the network (902). The second advertisement specifies a second prefix and the SID. Furthermore, in the example of FIG. 9, the first router determines a route to the first prefix (904).

In the example of FIG. 9, the first router may perform actions (906)-(910) based on the first advertisement and the second advertisement specifying the same SID and based on the first routing protocol being associated with a lower administrative distance than the second routing protocol. Particularly, the first router may select the SID to be associated with the route to the first prefix instead of the SID being associated with a route to the second prefix (908). Additionally, the first router may generate data associating the SID with the route to the first prefix (910). The first router may then install, as an active route, the route to the first prefix.

After installing the route, the first router may, as described with respect to FIG. 3, receive a packet having a label that specifies the SID. Based on the packet having the label that specifies the SID, based on the data associating the SID with the route to the first prefix and based on the route to the first prefix being an active route, the first router may forward the packet to a next hop on the route to the first prefix.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

What is claimed is:

1. A method comprising:
receiving, by a first router in a network, a first advertisement originated by a second router in a first Interior Gateway Protocol (IGP) level of the network, wherein the first advertisement specifies a first prefix and a segment identifier (SID);
receiving, by the first router, a second advertisement originated by a third router in a second IGP level of the network, wherein the second advertisement specifies a second prefix and the SID;
based on the first advertisement and the second advertisement specifying the same SID and based on the first IGP level having lower visibility than the second IGP level:
selecting, by the first router, the SID to be associated with a route to the first prefix instead of the SID being associated with a route to the second prefix;
generating, by the first router, data associating the SID with the route to the first prefix, wherein for each respective router of the first, second, and third routers:
the respective router has access to prefixes from routers of the network in IGP levels having the same visibility as or lower visibility than the respective router, and
the respective router does not have access to prefixes from routers of the network in IGP levels having higher visibility than the respective router except for prefixes leaked to the respective router; and
installing, by the first router, the route to the first prefix as an active route.

2. The method of claim 1, further comprising:
receiving, by the first router, a packet having a label that specifies the SID; and
based on the packet having the label that specifies the SID, based on the data associating the SID with the route to the first prefix and based on the route to the first prefix being an active route, forwarding, by the first router, the packet to a next hop on the route to the first prefix.

3. The method of claim 1, wherein, based on the first advertisement and the second advertisement specifying the same SID and based on the first IGP level having lower visibility than the second IGP level, the first router generates the data associating the SID with the route to the first prefix regardless of the second prefix being less than the first prefix.

4. The method of claim 1, further comprising:
receiving, by the first router, a third advertisement originated by a third router in the first IGP level, wherein the third advertisement specifies a third prefix and the SID, wherein the third prefix is different from the first prefix;
determining, by the first router, that the third prefix is leaked from the second IGP level and that the first prefix is not leaked from the second IGP level; and
responsive to determining that the third prefix is leaked from the second IGP level and that the first prefix is not leaked from the second IGP level, retaining, by the first router, the data associating the SID with the route to the first prefix.

5. The method of claim 4, wherein determining that the third prefix is leaked from the second IGP level and that the first prefix is not leaked from the second IGP level comprises:
determining, by the first router, based on a DOWN bit of the third advertisement being set, that the third prefix is leaked from the second IGP level; and
determining, by the first router, based a DOWN bit of the first advertisement not being set, that the first prefix is not leaked from the second IGP level.

6. The method of claim 1, further comprising:
receiving, by the first router, a third advertisement originated by a third router in the first IGP level, wherein the third advertisement specifies a third prefix and the SID, wherein the third prefix is different from the first prefix;
determining, by the first router, that the third prefix is not leaked from the second IGP level and that the first prefix is leaked from the second IGP level; and
responsive to determining that the third prefix is not leaked from the second IGP level, that the first prefix is leaked from the second IGP level, and that the first advertisement and the third advertisement specify the same SID:
selecting, by the first router, the SID to be associated with a route to the third prefix instead of the SID being associated with the route to the first prefix;
generating, by the first router, data associating the SID with the route to the third prefix;
uninstalling, by the first router, as an active route, the route to the first prefix; and
installing, by the first router, the route to the third prefix as an active route.

7. A method comprising:
receiving, by a first router in a network, a first advertisement originated by a second router in a first Interior Gateway Protocol (IGP) level of the network, wherein the first advertisement specifies a first prefix and a first segment identifier (SID);
receiving, by the first router, a second advertisement originated by a third router in a second IGP level of the network, wherein the second advertisement specifies a second prefix and a second SID, the second SID being different from the first SID;
based on the first prefix being equal to the second prefix and based on the first IGP level having lower visibility than the second IGP level:
selecting, by the first router, the first SID as being associated with a route to the first prefix instead of the second SID being associated with the route to the first prefix;
generating, by the first router, data associating the first SID with the route to the first prefix, wherein for each respective router of the first, second, and third routers:
the respective router has access to prefixes from routers of the network in IGP levels having the same visibility as or lower visibility than the respective router, and
the respective router does not have access to prefixes from routers of the network in IGP levels having higher visibility than the respective router except for prefixes leaked to the respective router; and
installing, by the first router, the route to the first prefix as an active route.

8. The method of claim 7, further comprising:
receiving, by the first router, a packet having a label that specifies the SID; and based on the packet having the label that specifies the SID, based on the data associating the SID with the route to the first prefix and based on the route to the first prefix being an active route, forwarding, by the first router, the packet to a next hop on the route to the first prefix.

9. The method of claim 7, wherein, based on the first advertisement and the second advertisement specifying the same prefix and based on the first IGP level having lower visibility than the second IGP level, the first router generates the data associating the SID with the route to the first prefix regardless of the second SID being less than the first SID.

10. The method of claim 7, further comprising:
receiving, by the first router, a third advertisement originated by a third router in the first IGP level, wherein the third advertisement specifies a third prefix and a third SID, wherein the third prefix is different from the first prefix;
determining, by the first router, that the third prefix is leaked from the second IGP level, that the first prefix is not leaked from the second IGP level, and that the third prefix is equal to the first prefix; and
responsive to determining that the third prefix is equal to the first prefix, the third prefix is leaked from the second IGP level, and the first prefix is not leaked from the second IGP level, retaining, by the first router, the data associating the first SID with the route to the first prefix.

11. The method of claim 10, wherein determining that the third prefix is leaked from the second IGP level and that the first prefix is not leaked from the second IGP level comprises:
determining, by the first router, based on a DOWN bit of the third advertisement being set, that the third prefix is leaked from the second IGP level; and
determining, by the first router, based a DOWN bit of the first advertisement not being set, that the first prefix is not leaked from the second IGP level.

12. The method of claim 7, further comprising:
receiving, by the first router, a third advertisement originated by a third router in the first IGP level, wherein the third advertisement specifies a third prefix and a third SID, wherein the third SID is different from the first SID;
determining, by the first router, that the third prefix is not leaked from the second IGP level, that the first prefix is leaked from the second IGP level, and the third prefix is equal to the first prefix;
responsive to determining that the third prefix is not leaked from the second IGP level and that the first prefix is leaked from the second IGP level, and the third prefix being equal to the first prefix:
selecting, by the first router, the third SID to be associated with the route to the first prefix instead of the first SID being associated with the route to the first prefix; and
generating, by the first router, data associating the third SID with the route to the first prefix.

13. A method comprising:
receiving, by a first router in a network, a first advertisement originated by a second router of the network, wherein the first advertisement specifies a first prefix and a segment identifier (SID), and the first advertisement belongs to a first routing protocol;
receiving, by the first router, a second advertisement originated by a third router of the network, wherein the second advertisement specifies a second prefix and the SID, and the second advertisement belongs to a second routing protocol;
based on the first advertisement and the second advertisement specifying the same SID and based on the first routing protocol being associated with a lower administrative distance than the second routing protocol:
selecting, by the first router, the SID to be associated with a route to the first prefix instead of the SID being associated with a route to the second prefix;
generating, by the first router, data associating the SID with the route to the first prefix; and
installing, by the first router, the route to the first prefix as an active route.

14. The method of claim 13, further comprising:
receiving, by the first router, a packet having a label that specifies the SID; and
based on the packet having the label that specifies the SID, based on the data associating the SID with the route to the first prefix and based on the route to the first prefix being an active route, forwarding, by the first router, the packet to a next hop on the route to the first prefix.

15. A router comprising:
a plurality of interface cards (IFCs) configured to:
receive a first advertisement originated by a second router in a first Interior Gateway Protocol (IGP) level of a network, wherein the first advertisement specifies a first prefix and a segment identifier (SID); and
receive a second advertisement originated by a third router in a second IGP level of the network, wherein the second advertisement specifies a second prefix and the SID; and
a control unit configured to:
based on the first advertisement and the second advertisement specifying the same SID and based on the first IGP level having lower visibility than the second IGP level:
select the SID to be associated with a route to the first prefix instead of the SID being associated with a route to the second prefix;
generate data associating the SID with the route to the first prefix, wherein for each respective router of the router, the second router, and the third router:
the respective router has access to prefixes from routers of the network in IGP levels having the same visibility as or lower visibility than the respective router, and
the respective router does not have access to prefixes from routers of the network in IGP levels having higher visibility than the respective
router except for prefixes leaked to the respective router; and install the route to the first prefix as an active route.

16. The router of claim 15, wherein:
the IFCs are configured to receive a packet having a label that specifies the SID,
the router further comprises a forwarding component, and
based on the packet having the label that specifies the SID, based on the data associating the SID with the route to the first prefix and based on the route to the first prefix being an active route, the control unit configures the forwarding component to forward the packet to a next hop on the route to the first prefix.

17. The router of claim 15, wherein, based on the first advertisement and the second advertisement specifying the same SID and based on the first IGP level having lower visibility than the second IGP level, the control unit generates the data associating the SID with the route to the first prefix regardless of the second prefix being less than the first prefix.

18. The router of claim 15, wherein:
the IFCs are configured to receive a third advertisement originated by a third router in the first IGP level, wherein the third advertisement specifies a third prefix and the SID, wherein the third prefix is different from the first prefix, and
the control unit is further configured to:
determine that the third prefix is leaked from the second IGP level and that the first prefix is not leaked from the second IGP level; and
responsive to determining that the third prefix is leaked from the second IGP level and the first prefix is not leaked from the second IGP level, retain the data associating the SID with the route to the first prefix.

19. The router of claim 18, wherein the control unit is configured such that, as part of determining that the third prefix is leaked from the second IGP level and that the first prefix is not leaked from the second IGP level, the control unit:
determines, based on a DOWN bit of the third advertisement being set, that the third prefix is leaked from the second IGP level; and
determines, based a DOWN bit of the first advertisement not being set, that the first prefix is not leaked from the second IGP level.

20. The router of claim 15, wherein:
the plurality of IFCs is configured to receive a third advertisement originated by a third router in the first IGP level, wherein the third advertisement specifies a third prefix and the SID, wherein the third prefix is different from the first prefix, and
the control unit is further configured to:
determine that the third prefix is not leaked from the second IGP level and that the first prefix is leaked from the second IGP level; and
responsive to determining that the third prefix is not leaked from the second IGP level, that the first prefix is leaked from the second IGP level, and that the first advertisement and the third advertisement specify the same SID:
select the SID to be associated with a route to the third prefix instead of the SID being associated with the route to the first prefix;
generate data associating the SID with the route to the third prefix;
uninstall, as an active route, the route to the first prefix; and
install the route to the third prefix as an active route.

21. A router comprising:
a plurality of interface cards (IFCs) configured to:
receive a first advertisement originated by a second router in a first Interior Gateway Protocol (IGP) level of a network, wherein the first advertisement specifies a first prefix and a first segment identifier (SID); and
receive a second advertisement originated by a third router in a second IGP level of the network, wherein the second advertisement specifies a second prefix and a second SID, the second SID being different from the first SID; and a control unit configured to:
based on the first prefix being equal to the second prefix and based on the first IGP level having lower visibility than the second IGP level:
select the first SID as being associated with a route to the first prefix instead of the second SID being associated with the route to the first prefix;
generate data associating the first SID with the route to the first prefix, wherein for each respective router of the router, the second router, and the third router:
the respective router has access to prefixes from routers of the network in IGP levels having the same visibility as or lower visibility than the respective router, and
the respective router does not have access to prefixes from routers of the network in IGP levels having higher visibility than the respective router except for prefixes leaked to the respective router; and
install the route to the first prefix as an active route.

22. The router of claim 21, wherein:
the IFCs are configured to receive a packet having a label that specifies the SID;
the router comprises a forwarding component, and
based on the packet having the label that specifies the SID, based on the data associating the SID with the route to the first prefix and based on the route to the first prefix being an active route, the control unit configures the forwarding component to forward the packet to a next hop on the route to the first prefix.

23. The router of claim 21, wherein, based on the first advertisement and the second advertisement specifying the same prefix and based on the first IGP level having lower visibility than the second IGP level, the control unit generates the data associating the SID with the route to the first prefix regardless of the second SID being less than the first SID.

24. The router of claim 21, wherein:
the IFCs are configured to receive a third advertisement originated by a third router in the first IGP level, wherein the third advertisement specifies a third prefix and a third SID, wherein the third prefix is different from the first prefix, and
the control unit is configured to:
determine that the third prefix is leaked from the second IGP level, that the first prefix is not leaked from the second IGP level, and that the third prefix is equal to the first prefix; and
responsive to determining that the third prefix is equal to the first prefix, the third prefix is leaked from the second IGP level, and the first prefix is not leaked from the second IGP level, the control unit retains the data associating the first SID with the route to the first prefix.

25. The router of claim 24, wherein the control unit is configured such that, as part of determining that the third prefix is leaked from the second IGP level and that the first prefix is not leaked from the second IGP level, the control unit:
determines, based on a DOWN bit of the third advertisement being set, that the third prefix is leaked from the second IGP level; and
determines, based a DOWN bit of the first advertisement not being set, that the first prefix is not leaked from the second IGP level.

26. The router of claim 21, wherein:

the IFCs are configured to receive a third advertisement originated by a third router in the first IGP level, wherein the third advertisement specifies a third prefix and a third SID, wherein the third SID is different from the first SID, and the control unit is configured to:
- determine that the third prefix is not leaked from the second IGP level, that the first prefix is leaked from the second IGP level, and the third prefix is equal to the first prefix; and
- responsive to determining that the third prefix is not leaked from the second IGP level and that the first prefix is leaked from the second IGP level, and the third prefix being equal to the first prefix:
  - select the third SID to be associated with the route to the first prefix instead of the first SID being associated with the route to the first prefix; and
  - generate data associating the third SID with the route to the first prefix.

27. A router comprising:

a plurality of interface cards (IFCs) configured to:
- receive a first advertisement originated by a second router of a network, wherein the first advertisement specifies a first prefix and a segment identifier (SID) and the second advertisement belongs to a second routing protocol;
- receiving, by the first router, a second advertisement originated by a third router of the network, wherein the second advertisement specifies a second prefix and the SID,. and the second advertisement belongs to a second routing protocol; and a control unit configured to:
- based on the first advertisement and the second advertisement specifying the same SID and based on the first routing protocol being associated with a lower administrative distance than the second routing protocol:
  - select the SID to be associated with a route to the first prefix instead of the SID being associated with a route to the second prefix;
  - generate data associating the SID with the route to the first prefix; and
  - install the route to the first prefix as an active route.

28. The router of claim 27, wherein:

the IFCs are configured to receive a packet having a label that specifies the SID; and based on the packet having the label that specifies the SID, based on the data associating the SID with the route to the first prefix and based on the route to the first prefix being an active route, the control unit is configured to forward the packet to a next hop on the route to the first prefix.

* * * * *